US011287278B1

(12) United States Patent
Tsoupko-Sitnikov et al.

(10) Patent No.: US 11,287,278 B1
(45) Date of Patent: Mar. 29, 2022

(54) OFFLINE REGISTRATION OF ELEMENTS BETWEEN MAPS

(71) Applicants: Mikhail Tsoupko-Sitnikov, Campbell, CA (US); Can Koc, San Jose, CA (US); Marlene Wan, Cupertino, CA (US); Lukas M. Marti, San Jose, CA (US)

(72) Inventors: Mikhail Tsoupko-Sitnikov, Campbell, CA (US); Can Koc, San Jose, CA (US); Marlene Wan, Cupertino, CA (US); Lukas M. Marti, San Jose, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 16/550,798

(22) Filed: Aug. 26, 2019

Related U.S. Application Data

(60) Provisional application No. 62/727,651, filed on Sep. 6, 2018.

(51) Int. Cl.
*G01C 21/34* (2006.01)
*G01C 21/36* (2006.01)
*G05D 1/02* (2020.01)

(52) U.S. Cl.
CPC ....... *G01C 21/367* (2013.01); *G01C 21/3446* (2013.01); *G01C 21/3453* (2013.01); *G05D 1/0212* (2013.01)

(58) Field of Classification Search
CPC .............. G01C 21/367; G01C 21/3446; G01C 21/3453; G01C 21/267; G05D 1/0212
See application file for complete search history.

(56) References Cited

U.S. PATENT DOCUMENTS

| | | | |
|---|---|---|---|
| 8,340,360 B2 | 12/2012 | Chen et al. | |
| 8,359,156 B2 | 1/2013 | Guo et al. | |
| 8,949,196 B2 | 2/2015 | Duleba | |
| 2006/0041375 A1* | 2/2006 | Witmer | G01C 15/00 701/532 |
| 2007/0014488 A1 | 1/2007 | Chen et al. | |
| 2014/0132608 A1* | 5/2014 | Mund | G01C 21/30 345/440 |
| 2017/0039258 A1 | 2/2017 | Shah | |

* cited by examiner

*Primary Examiner* — Anshul Sood
(74) *Attorney, Agent, or Firm* — Young Basile Hanlon & MacFarlane, P.C.

(57) ABSTRACT

A method includes obtaining a first map element from a first map, identifying second map elements from a second map based on locations of the second map elements relative to the first map element, and identifying first and second point on the second map elements based on proximity to beginning and ending points of the first map element. One or more of the second map elements define a corresponding portion of the second map between the first point and the second point. The method also includes determining a registration score for the first map element relative to the corresponding portion of the second map, and in response to determining that the registration score indicates a match between the first map element and the corresponding portion of the second map, defining registration information that describes a relationship between the first map element and the corresponding portion of the second map.

22 Claims, 10 Drawing Sheets

OFFLINE REGISTRATION OF ELEMENTS BETWEEN MAPS

CROSS-REFERENCE TO RELATED APPLICATIONS

This application claims the benefit of U.S. Provisional Application No. 62/727,651, filed on Sep. 6, 2018, the content of which is hereby incorporated by reference in its entirety for all purposes.

TECHNICAL FIELD

The application relates generally to the field of digital maps.

BACKGROUND

Digital maps store mapping information in a computer-interpretable format and can include and display features similar to those associated with traditional paper maps, such as geographical features, topographical features, political boundaries, attractions, and transportation networks. Transportation network features that can be displayed on maps include roadways, transit routes, walking paths, and biking paths. In addition, maps can be annotated with various types of information, such as locations and descriptions of businesses.

Route generation is a core component of most navigation software products. In one typical use case, a device has access to navigational map data that can be used to generate the route on the device. The device may access the navigational map data by local storage of information, or by the ability of the device to access the information over a network connection on an as-needed basis. In another typical case, a route is generated on a remote server that has access to the navigational map data, and a turn-by-turn route is transferred to the device by the remote server. In both cases, a single map (i.e., collection of map information) is used for generating route and displaying the route.

SUMMARY

One aspect of the disclosure is a method that includes obtaining a first map element from a first map, identifying second map elements from a second map based on locations of the second map elements from the second map relative to the first map element from the first map, identifying a first point on the second map elements from the second map based on proximity to a beginning point of the first map element from the first map, and identifying a second point on the second map elements from the second map based on proximity to an ending point of the first map element. One or more of the second map elements define a corresponding portion of the second map between the first point and the second point. The method also includes determining a registration score for the first map element from the first map relative to the corresponding portion of the second map, and in response to determining that the registration score indicates a match between the first map element from the first map and the corresponding portion of the second map, defining registration information that describes a relationship between the first map element from the first map and the corresponding portion of the second map.

The registration score may be based in part on proximity of the first map element from the first map to the corresponding portion of the second map. Proximity of the first map element from the first map to the corresponding portion of the second map may be determined based on a Hausdorff distance value. The registration score may be based in part on a comparison of an angular orientation of the first map element from the first map to an angular orientation of the corresponding portion of the second map. The registration score may be based in part on a comparison of a length of the first map element from the first map to a length of the corresponding portion of the second map.

The corresponding portion of the second map may include only one of the second map elements from the second map, or the corresponding portion of the second map may be defined by two or more of the second map elements from the second map that are sequentially connected. In some implementations, the method includes verifying that the corresponding portion of the second map is defined by sequentially connected map elements from the second map elements from the second map by determining that a traversable route exists along the second map elements from the second map from the first point to the second point.

In some implementations, identifying the second map elements from the second map includes identifying a sequence of map elements from the first map, the sequence of map elements including the first map element from the first map, and determining a route using the second map elements from the second map that corresponds to travel from a start point of the sequence of map elements to an end point of the sequence of map elements.

The registration information may include a list of one or more of the second map elements from the corresponding portion of the second map, a beginning offset value that represents a location of the first point, and an ending offset value that represents a location of the second point.

Another aspect of the disclosure is non-transitory computer-readable storage device including program instructions executable by one or more processors that, when executed, cause the one or more processors to perform operations. The operations include obtaining a first map element from a first map, identifying second map elements from a second map based on locations of the second map elements from the second map relative to the first map element from the first map, identifying a first point on the second map elements from the second map based on proximity to a beginning point of the first map element from the first map, and identifying a second point on the second map elements from the second map based on proximity to an ending point of the first map element. One or more of the second map elements from the second map define a corresponding portion of the second map between the first point and the second point. The operations also include determining a registration score for the first map element from the first map relative to the corresponding portion of the second map, and in response to determining that the registration score indicates a match between the first map element from the first map and the corresponding portion of the second map, defining registration information that describes a relationship between the first map element from the first map and the corresponding portion of the second map.

Another aspect of the disclosure is a system that includes a memory and a processor configured to execute instructions stored in the memory to obtain a from a first map, identify second map elements from a second map based on locations of the second map elements from the second map relative to the first map element from the first map, identify a first point on the second map elements from the second map based on proximity to a beginning point of the first map element from the first map, and identify a second point on the second map elements from the second map based on proximity to an ending point of the first map element. One or more of the second map elements from the second map define a corresponding portion of the second map between the first point and the second point. The processor is further configure to execute instructions stored in the memory to determine a registration score for the first map element from the first map relative to the corresponding portion of the second map, and in response to a determination that the registration score indicates a match between the first map element from the first map and the corresponding portion of the second map, define registration information that describes a relationship between the first map element from the first map and the corresponding portion of the second map.

DETAILED DESCRIPTION

Figure 1:
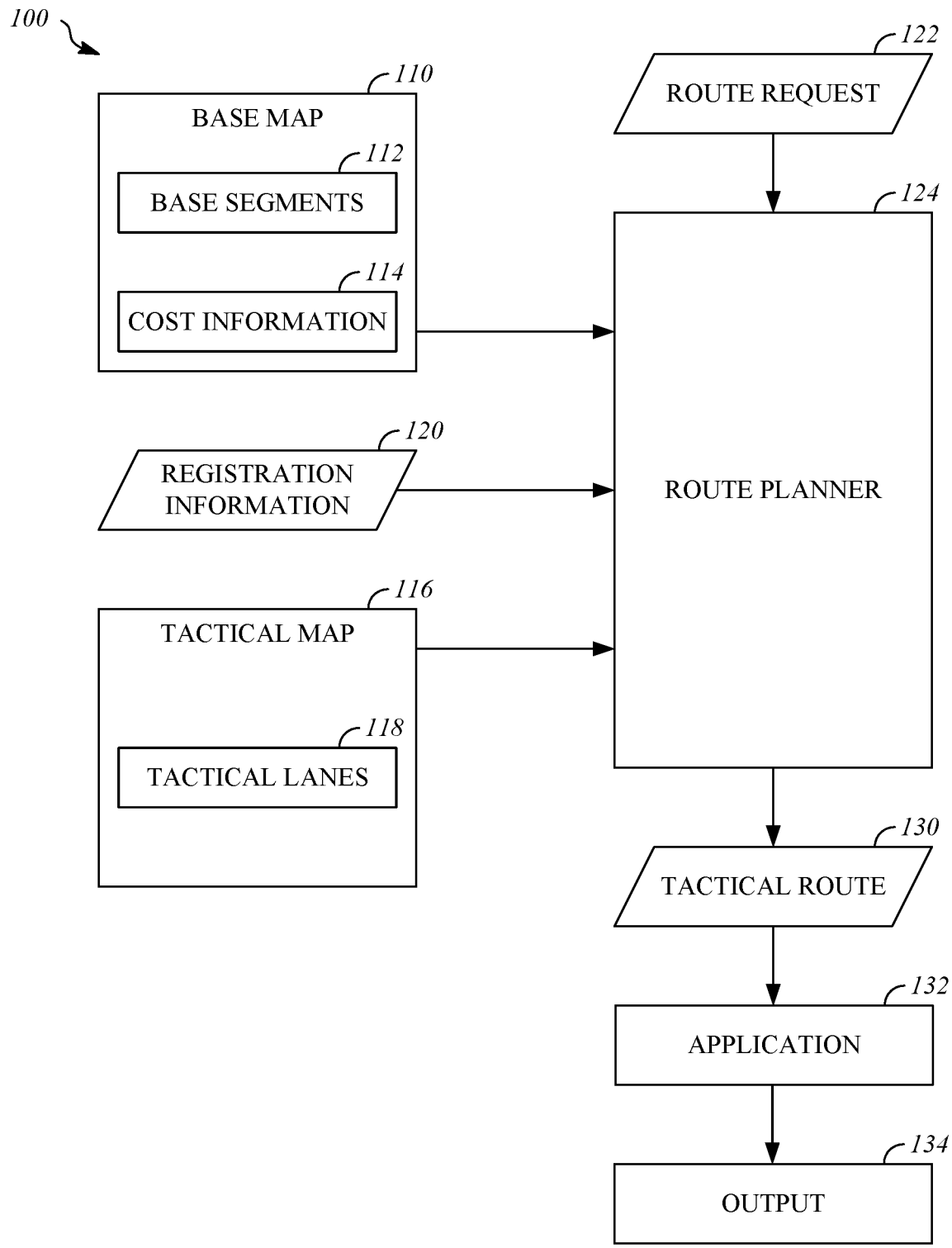
FIG. 1 is a block diagram that shows a routing system.

The disclosure herein is directed to offline registration of map elements between maps that have different geometrical and topographical resolutions. As used herein, the term "map element" refers to a collection of information that describe a feature of an environment. Some of the map elements represent roads, and these map elements may be referred to as "road elements."

The techniques described herein generate registration information that defines relationships between locations on a first map and locations on second map. This information can be pre-computed and stored for later use. For example, the pre-computed information can be used to establish correspondence between elements from the first map and elements from the second map. By establishing the correspondence between elements from the first map and elements from the second map, information can be transferred between the maps.

In some of the examples that are described herein, registration is performed between a "tactical map" and a "base map." The tactical map may be a "high-definition map" that includes a high level of detail regarding certain features, such as by including representations of roads at the lane-level, to allow navigation and vehicle control functions to include consideration of which travel lanes of a road to use and how to move between them. The tactical map may include geometric information that describes the spatial extents of a roadway lane. As an example, a lane may be represented in a tactical map by a series of line segments that define a bounded area. The base map may include a lower level of geometric detail than the tactical map, and may describes road at a road segment level, which aggregates information across multiple lanes (if present) and lacks explicit lane information. The base map may encode road segments using a simplistic geometric representation, such as by representing road segments as lines or polylines. The base map may, however, include a large amount of metadata that describes functional or operational aspects of road segments, such as detailed cost information that can be used for routing purposes.

Offline registration of map information can be used to infer the attributes of the map elements on the first map from their counterparts (i.e., corresponding map elements) on the second map, using precomputed relationships between map elements of the first map and map elements of the second map. This allows a cost-aware route computation on the first map (e.g., the tactical map) that lacks the cost-related attributes, by utilizing the registration information to access or import the cost-related attributes from the second map (e.g., the base map).

Due to the fact that the base map and the tactical map are expected to differ both geometrically and topologically, establishing the element-to-element correspondence between two maps is ambiguous. One source of ambiguity results from positional errors in one or both of the base map and the tactical map, that cause the map elements from the base map and the tactical map to not be collocated. Another source of ambiguity results from different portioning of roads and lanes into road segments and lane segments.

The systems and methods described herein allow for registration of map elements between two maps that have different levels of detail and/or lack direct correspondence between map elements (such as by differing positions or extents). The systems and methods described herein also allow map elements from two different maps to be registered offline (i.e., not in real-time after a route has been determined). The resulting information may include per-element registration data that can be used to transfer information from the base map to the tactical map, including routes that are calculated using the base map and information that is encoded in the base map (e.g., cost information).

Implementations of the systems and methods described herein may use routing queries to obtain connected sequences of base map segments that can be used for registration. Implementations of the systems and methods described herein may match elements between maps using registration scores (metrics) that are based on proximity, angle, and relative length difference. In some implementations, performance of a registration system can be improved by reusing registration records from a first map element for all of its strongly connected neighbors (e.g., adjacent travel lanes on a multilane roadway). In some implementations, the systems and methods described herein can be implemented using a distributed computing system.

FIG. 1 is a block diagram that shows a routing system 100. The routing system 100 may be implemented, in part, using one or more computing devices. As an example, suitable computing devices for use in implementing the routing system 100 can include a memory, a processor, and program instructions that are stored in the memory and cause the processor to perform actions when executed. The routing system 100 can be implemented using a single computing device or using multiple computing devices that communication by sending and receiving information using wired or wireless communications systems.

The routing system 100 utilizes a base map 110 that has base segments 112 and cost information 114. The routing system also utilizes a tactical map 116 that has tactical lanes 118. Registration information 120 is used by the routing system 100 to determine correspondence between elements of the base map 110 and the tactical map 116. To express relationships between elements of the base map 110 and the tactical map 116, the registration information may include, for example, information identifying one or more elements from the base map 110, information identifying one or more elements from the tactical map 116 that represent the same features as the one or more elements from the base map 110, and values that describe the positions of starting and ending points of the elements from the base map 110 relative to starting and ending points of the corresponding elements from the tactical map 116. Systems and methods for determining and generating the registration information 120 will be described in detail herein.

As an overview of processing performed by the routing system 100, in response to a route request 122, a route planner 124 uses the base map 110, the tactical map 116 and the registration information 120 to determine a tactical route 130. The tactical route 130 is a route that is described using map elements from the tactical map 116, such as the tactical lanes 118. The route planner 124 uses the registration information 120 and the cost information 114 from the base map 110 to determine a tactical route 130, which is expressed using map elements from the tactical map 116, such as the tactical lanes 118. The registration information 120 allows transferring the cost information from the base segments 112 to the tactical lanes 118. Transferring the cost information allows using known routing algorithms such as, but not limited to, Dijkstra or A* (or their derivations) directly on the tactical map 116. The tactical route 130 and the tactical map 116 can be utilized by an application 132 to produce an output 134, such as a display of content or control of another system.

The base map 110 includes map elements, which are collections of information that describe features of an environment, such as geographic features. The map elements of the base map 110 include the base segments 112. The base segments 112 describe segments of a transportation network, which may include roadway segments (i.e., portions of motorized transportation facilities) and pathway segments (i.e., portions of non-motorized transportation facilities). As an example, the base segments 112 can be described geometrically as segments of a polyline, where each segment of the polyline represents part of a roadway, for example, inclusive of all lanes of travel in at least one direction. In some implementations, the base segments 112 lack lane-level information for roadways that that are included in the base map 110. The map elements of the base map 110 may also include information describing various other features of an environment, such as traffic signals, traffic signs, parking locations, buildings, business locations, points of interest, etc.

Each of the base segments 112 can be described in terms of location, directionality, and connections to other ones of the base segments 112. As an example, each of the base segments 112 can be described by beginning and ending points having locations expressed in a coordinate system, such as latitude, longitude, and elevation. The directionality of each of the base segments 112 indicates permissible directions of travel, such as by indicating a one-way travel direction or by indicating that two-way travel is permitted. Connectivity to other segments can be described for each of the base segments 112, by unique identification codes that indicate the adjacent segments.

The base map 110 also includes cost information 114. The cost information 114 is information that is used for route planning, and indicates the desirability of utilizing each of the base segments 112 in a route. The cost information 114 can include, as examples, speed limit information, traffic information, and travel time information. Traffic information may include a metric that describes how busy a road is and may include real-time and/or historical information. As one example, traffic information may include absolutes value that are estimates a vehicle volume travelling along one of the base segments at a particular time of day (e.g., 4,000 vehicles per hour at 8:00 am). As another example, traffic information may be expressed as a relative value that compares an estimated traffic volume to the capacity of the road. As another example, traffic information may be expressed as an added amount of time required to traverse one of the base segments 112 as compared to free-flow conditions. Traffic information may also include descriptions of incidents (e.g., crashes) that are reported in real time. Travel time information is an estimate of the amount of time that is required to traverse one of the base segments 112, and may include real-time and/or historical information.

The routing system 100 also includes the tactical map 116. The term "tactical" refers to the incorporation of map elements that provide lane-level information for roadways in the tactical map 116, which allows the tactical map to be used for providing lane-level guidance to a human user or to an automated system. The map elements of the tactical map 116 include one or more of the tactical lanes 118, which represent travel lanes of a roadway. Other types of features may also be represented by the map elements of the tactical map 116.

The tactical lanes 118 describe lanes of a roadway. The tactical lanes 118 may be expressed as collections of information that each describe the two-dimensional location and configuration of a roadway lane and may also describe the elevational location and configuration of a roadway lane. The tactical lanes 118 also include information about directionality (i.e., permissible direction of travel), connectivity to previous and subsequent ones of the tactical lanes 118, and permeability relative to adjacent ones of the tactical lanes 118 (e.g., whether lane changes are permissible).

Portions of the base map 110 and the tactical map 116 describe the same features. As an example, a subset of the base segments 112 and a subset of the tactical lanes 118 can describe the same section of a roadway. The information included in the tactical map 116 and the base map 110 is, however, different. As one example, the beginning and ending points of the base segments 112 and the beginning and ending points of the tactical lanes 118 may be at different positions along the length of the roadway, owing to differences in map digitization methods, different spatial resolutions used for defining map segments during digitization, and different errors made when digitizing each of the base map 110 and the tactical map 116. Thus, the base segments 112 and the tactical lanes 118 may not be co-located and/or the same roadway may be partitioned into segments differently leading to different starting and ending points for the base segments 112 and the tactical lanes 118.

The base map 110 and the tactical map 116 also differ in their informational content. In the described example, the base map 110 includes the cost information 114 and the tactical map 116 does not include information describing costs that can be used for route planning, or alternatively, includes a less extensive set of cost information. Also, in the described example, the base map 110 has a segment-level resolution that does not include lane information, while the tactical map has a lane-level resolution that does include lane information.

Figure 2:
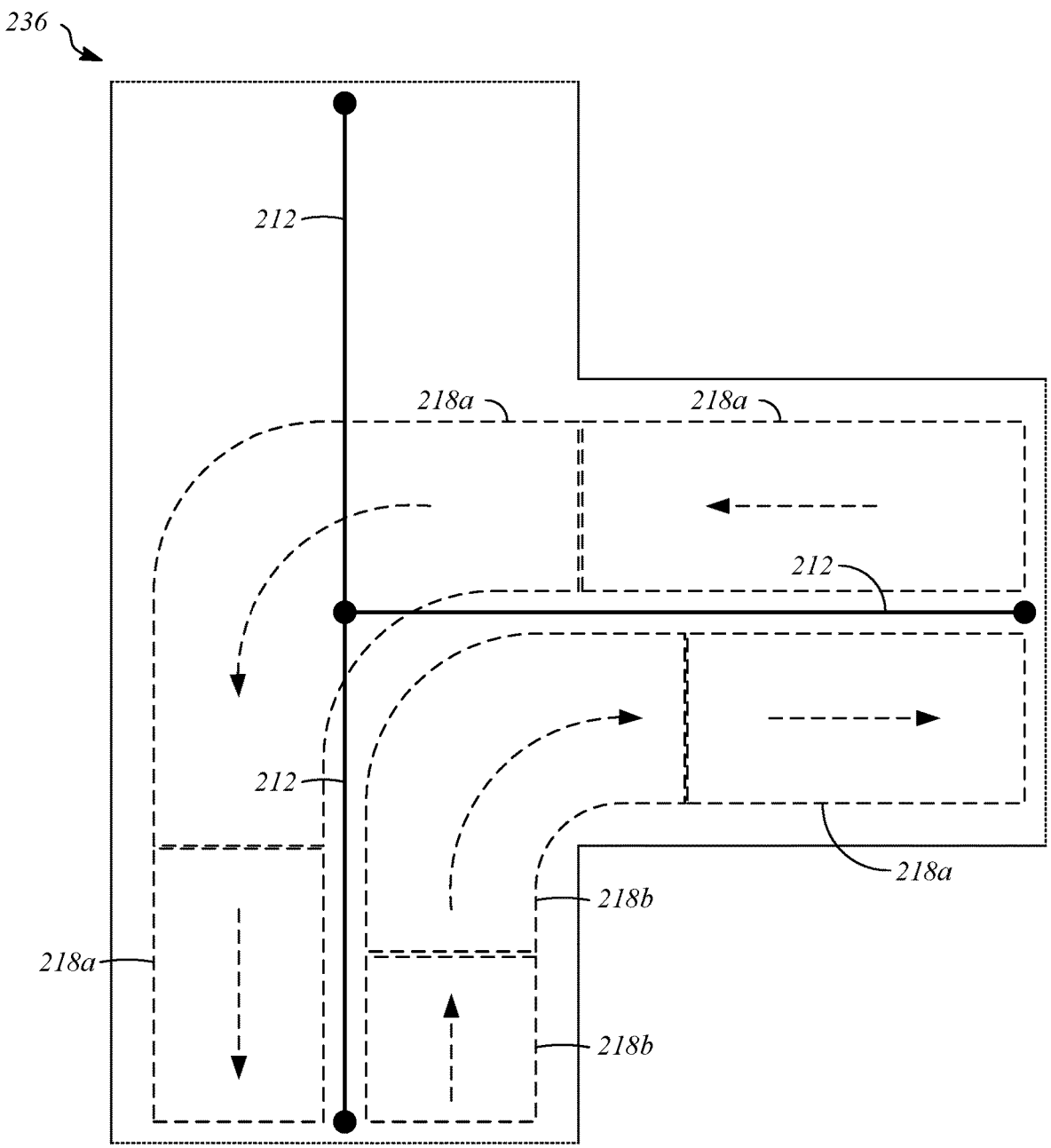
FIG. 2 is an illustration that shows an example of a roadway with graphical depictions of base segments, a first series of tactical lanes, and a second series of tactical lanes.

FIG. 2 is an illustration that shows an example of a roadway 236 with graphical depictions of base segments 212, a first series of tactical lanes 218a, and a second series of tactical lanes 218b that describe the roadway 236. In the illustrated example, which depicts a T-intersection where two roads meet, the base segments 212 are represented as lines and nodes that represent two-directional portions of the roadway. The first and second groups of tactical lanes 218a, 218b are represented as three dimensional areas that are each associated with a directionality. The first series of tactical lanes 218a represents a path that can be followed by traversing the lanes sequentially according to their respective directionalities to define a left-turn movement through the T-intersection. The second series of tactical lanes 218b represent a path that can be followed by traversing the lanes sequentially according to their respective directionalities to define a right-turn movement through the T-intersection. Other tactical lanes that may be present at the depicted intersection are omitted from the illustrated example to enhance clarity.

With further reference to FIG. 1, the route request 122 is provided to the route planner 124 as input. The route request 122 can describe a starting point and an ending point for a trip. The starting point may be omitted from the route request, in lieu of assuming that the starting point is a current location of the system (e.g., a smart phone or vehicle-based navigation system) that the route request was received from. The route request 122 may include constraints such as intermediate waypoints, directives to avoid certain types of transportation facilities, and/or directives to optimize according to a specified criterion such as fuel consumption or travel time. The route request 122 may originate from a human user or from an automated system.

The route planner 124 generates the tactical route 130 in response to receiving the route request 122. The tactical route 130 describes roadways and/or paths that can be used to travel from the starting point to the destination. As one example, the tactical route 130 can be expressed as a series of the tactical lanes 118 from the tactical map 116. The tactical route 130 can be determined using the tactical lanes 118 (with the cost information 114 transferred to the tactical lanes 118 from base segments 112) according to well-known pathfinding algorithms, such as A* or Dijkstra's algorithm. The route planner 124 may be configured to select among multiple valid routes from a starting point to a destination using an optimization process based on cost or using another suitable mechanism.

The tactical route 130 and the tactical map 116 are utilized by the application 132. As one example, the application 132 may be a map display application and the output 134 is a visual display (e.g., output using a display device) that shows the tactical map 116 to a user with a representation of the tactical route 130, such as a graphical marking on the display of the tactical map 116 or a set of turn-by-turn directions that can be used for navigation. As another example, the application 132 may be an autonomous vehicle control system that is operable to control an autonomous vehicle and the output 134 may be a command that causes the autonomous vehicle to travel toward a destination using the tactical route 130.

Figure 3:
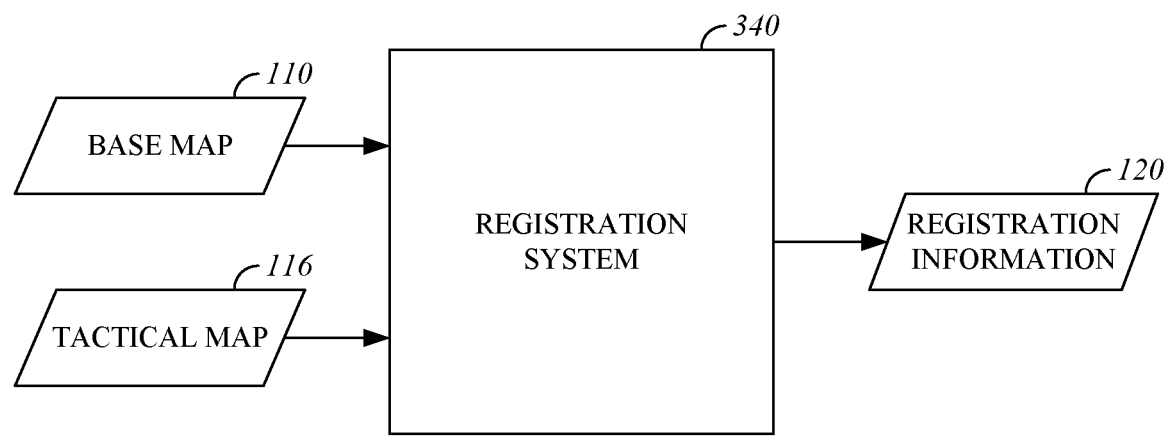
FIG. 3 is an illustration that shows a registration system.

FIG. 3 is an illustration that shows a registration system 340. The registration system 340 receives the base map 110 and the tactical map 116 as inputs. The registration system 340 produces the registration information 120 as an output. The registration system 340 establishes a correspondence between the tactical lanes 118 of the tactical map 116 and the base segments 112 of the base map 110. In the examples described herein, correspondence is established by identifying, for each of the tactical lanes 118 from the tactical map 116, one or more of the base segments 112 or portions thereof that represent the same physical transportation facility. The correspondence between the tactical lanes 118 of the tactical map 116 and the base segments 112 of the base map 110 is recorded as part of the registration information 120.

Typically, there is not a one-to-one correspondence between the tactical lanes 118 and the base segments 112. To define the relationship between the extents of the tactical lanes 118 and the extents of the base segments 112, additional information can be included in the registration information 120, such as starting and ending offsets.

Figure 4:
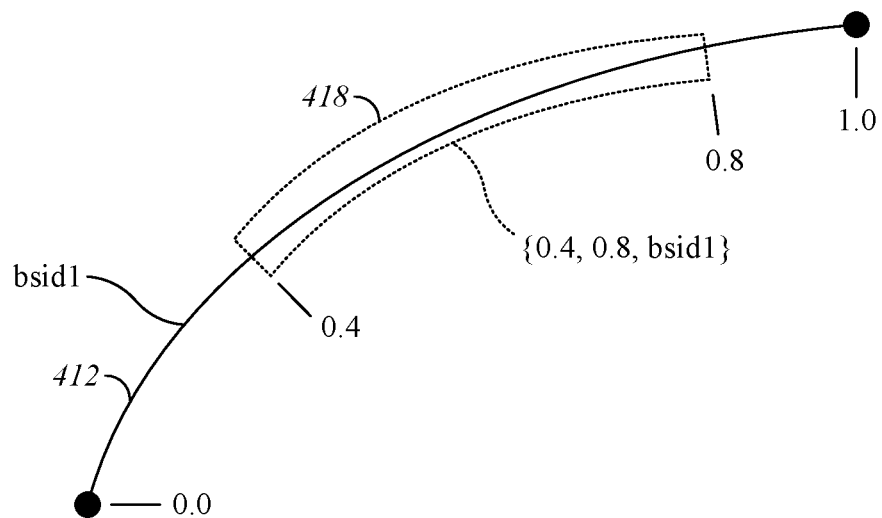
FIG. 4 shows a first example of map element registration in which a beginning point, and an ending point of a tactical lane fall within the extents of a single base segment.

FIG. 4 shows a first example of map element registration in which a beginning point and an ending point of a tactical lane 418 fall within the extents of a base segment 412. In the illustrated example, the base segment 412 may be referenced using a base segment identifier bsid1, which allows the base segment 412 to be identified among the base segments 112 of the base map 110. The positions along the base segment 412 are encoded in terms of an offset value with respect to the beginning of the base segment 412. In the illustrated example, a beginning point of the base segment 412 is indicated by the value 0.0 and an ending point of the base segment 412 is indicated by the value 1.0. The tactical lane 418 begins at a point along the base segment 412 that is described by offset value 0.4 and ends at a point along the base segment 412 that is described by offset value 0.8. As an example, the information included in the registration information 120 may be of the form {0.4, 0.8, bsid1}, which indicates that the tactical lane 418 starts at offset 0.4, ends at offset 0.8, and starts and ends within the base segment associated with the base segment identifier bsid1. Thus, in this example, the registration information 120 is updated to describe a relationship between a single one of the tactical lanes 118 and a portion of a single one of the base segments. Thus, in this example, the information included in the registration information 120 describes a start offset and an end offset within a base segment that corresponds to a tactical lane, along with the base segment identifier for the tactical lane.

Figure 5:
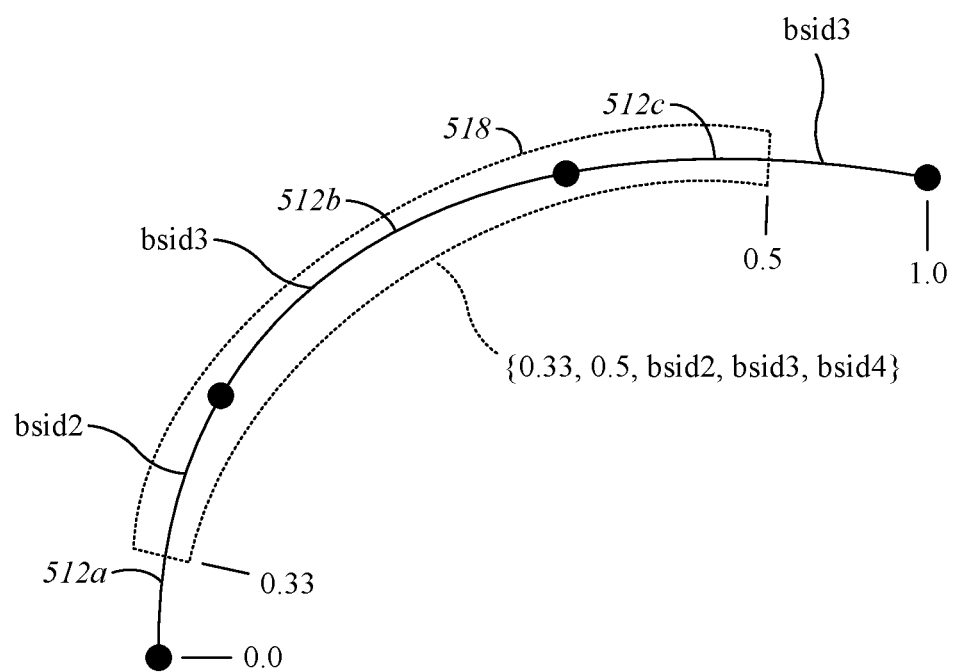
FIG. 5 shows a second example of map element registration in which a beginning point and an ending point of a tactical lane fall within different base segments.

FIG. 5 shows a second example of map element registration in which a beginning point and an ending point of a tactical lane 518 fall within different base segments. In the illustrated example, the tactical lane 518 starts at offset value 0.33 with a first base segment 512a, passes through a second base segment 512b, and ends at offset value 0.5 within a third base segment 512c. The first base segment 512a, the second base segment 512b, and the third base segment 512c define a continuous drivable sequence. The first base segment 512a may be referenced using base segment identifier bsid2, the second base segment 512b may be referenced using base segment identifier bsid3, and the third base segment 512c may be referenced using base segment identifier bsid3.

The registration information 120 may include values for the beginning offset value, the ending offset value, and a list of all base segments that the tactical lane 518 is present in. In the illustrated example, the information included in the registration information 120 may be of the form {0.33, 0.5, bsid2, bsid3, bsid4}, which indicates that the tactical lane 518 starts at offset 0.33 of bsid2, ends at offset 0.5 of bsid4, and is present within all of bsid2, bsid3, and bsid4. Thus, in this example, the information included in the registration information 120 describes a start offset within one of the base segments that occurs first in a series of segments that correspond to a tactical lane, an end offset with one of the base segments that occurs last in the series of base segments that correspond to the tactical lane, and a series of base segment identifiers that correspond to the base segments that correspond to the tactical lane.

Figure 6:
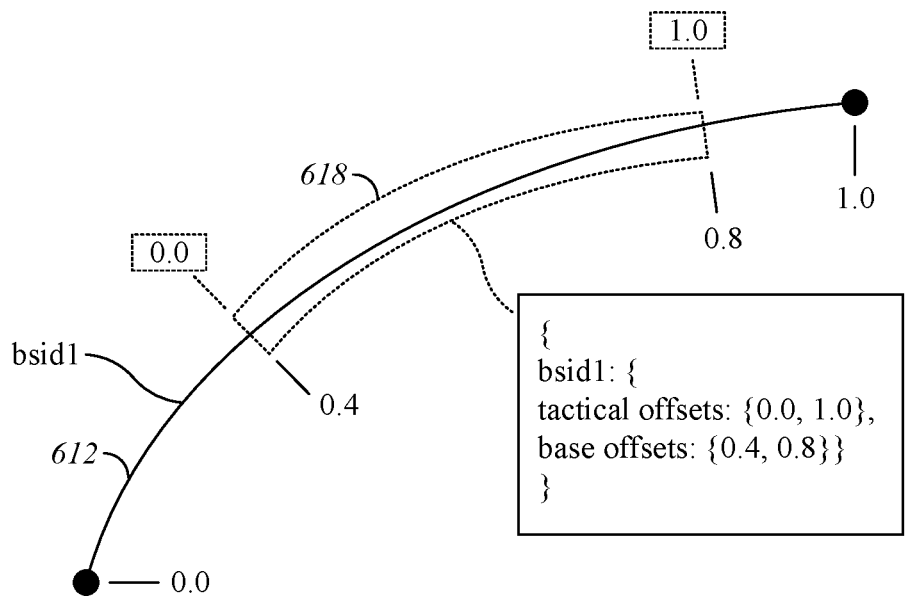
FIG. 6 shows a third example of map element registration in which a beginning point, and an ending point of a tactical lane fall within the extents of a single base segment.

FIG. 6 shows a third example of map element registration in which a beginning point and an ending point of a tactical lane 618 fall within the extents of a base segment 612. In the illustrated example, the base segment 612 may be referenced using a base segment identifier bsid1, which allows the base segment 612 to be identified among the base segments 112 of the base map 110. In this example, a two-way relative position encoding scheme is used in which offset values are determined both for the extents of the tactical lane 618 with respect to the base segment 612, and for the extents of the base segment 618 with respect to the tactical lane 618.

The positions along the base segment 612 are encoded in terms of a base offset value with respect to the beginning of the base segment 612. In the illustrated example, a beginning point of the base segment 612 is indicated by the value 0.0 and an ending point of the base segment 612 is indicated by the value 1.0. The tactical lane 618 begins at a point along the base segment 612 that is described by base offset value 0.4 and ends at a point along the base segment 612 that is described by base offset value 0.8.

The positions along the tactical lane 618 that correspond to the base offset values are encoded as tactical offset values referenced from the beginning of the tactical lane 618. These points may be beginning points of the tactical lane 618, ending points of the tactical lane 618, beginning points of the base segment 618, or ending points of the base segment 618.

As an example, the information included in the registration information 120 may be of the following form:
{
bsid1: {
tactical offsets: {0.0, 1.0},
base offsets: {0.4, 0.8}}
}

This is a set of information, indicated by the outermost pair of brackets, that describes the tactical lane 618 with respect to one or more base segments, such as the base segment 618, which is denoted by bsid1 in the illustrated example. The first tactical offset value, 0.0, indicates that the beginning of the tactical lane 618 is located in the base segment identified as bsid1. The second tactical offset value, 1.0, indicates that the end of the tactical lane 618 is located in the base segment identified as bsid1. The base offset value 0.4 indicates the position along the base segment 612 that corresponds to the first tactical offset value, which in this case indicates that the beginning of the tactical lane 618 occurs at a point that is located at forty percent of the distance from the beginning of the base lane 612 (bsid1). The base offset value 0.8 indicates the position along the base segment 612 that corresponds to the second tactical offset value, which in this case indicates that the end of the tactical lane 618 occurs at a point that is located at eighty percent of the distance from the beginning of the base lane 612 (bsid1).

Figure 7:
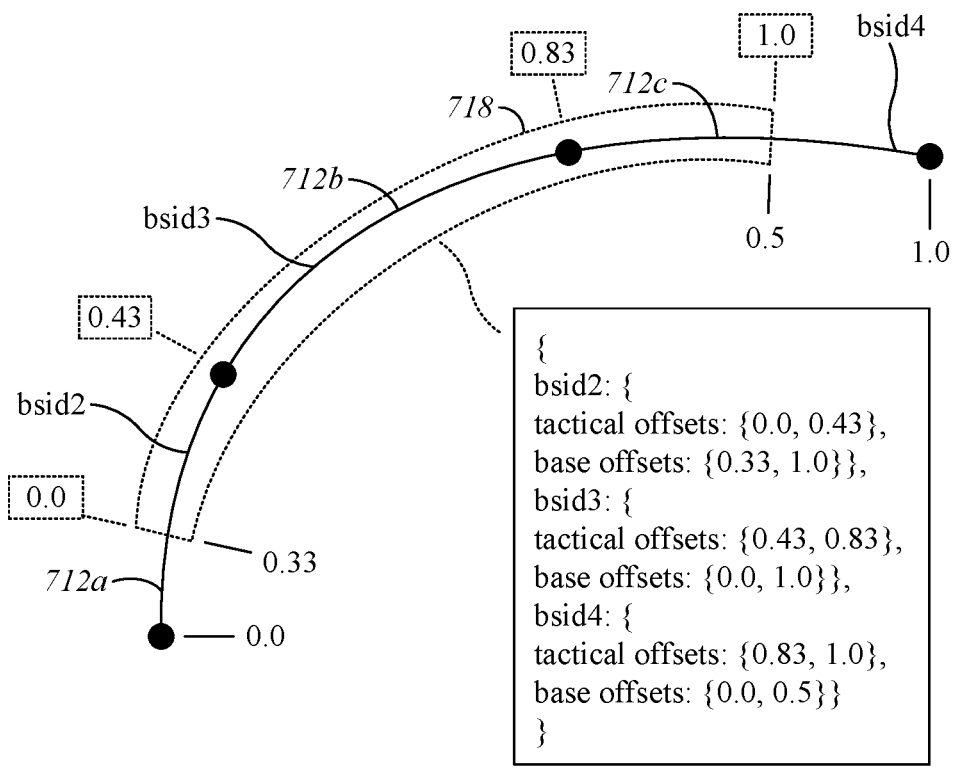
FIG. 7 shows a fourth example of map element registration in which a beginning point and an ending point of a tactical lane fall within different base segments.

FIG. 7 shows a fourth example of map element registration in which a beginning point and an ending point of a tactical lane 718 fall within different base segments. As in FIG. 6, a two-way relative position encoding scheme is used in which offset values are determined both for the extents of the tactical lane 618 with respect to the base segment 612, and for the extents of the base segment 618 with respect to the tactical lane 618.

In the illustrated example, the tactical lane 718 starts at base offset value 0.33 relative to a first base segment 712*a* (bsid2), passes through a second base segment 712*b* (bsid3), and ends at offset value 0.5 within a third base segment 712*c* (bsid4). The first base segment 712*a*, the second base segment 712*b*, and the third base segment 712*c* define a continuous drivable sequence.

The registration information 120 may include values for each of the base segments to separately indicate the positional relationships of the tactical lane 718 relative to the first base segment 712*a* (bsid2), the second base segment 712*b* (bsid3), and the third base segment 712*c* (bsid4). This information may be in the following form:
{
bsid2: {
tactical offsets: {0.0, 0.43},
base offsets: {0.33, 1.0}},
bsid3: {
tactical offsets: {0.43, 0.83},
base offsets: {0.0, 1.0}},
bsid4: {
tactical offsets: {0.83, 1.0},
base offsets: {0.0, 0.5}}
}

For bsid2, the tactical offset of 0.0 indicates that the tactical lane 718 begins in base segment bsid2 at base offset 0.33 (i.e., thirty three percent of the distance from the start of bsid2) and the tactical offset 0.43 indicates that the end of base segment bsid2, as indicated by base offset 1.0, occurs at a point corresponding to forty-three percent of the distance from the beginning of the tactical lane 718 to its end. For bsid3 the tactical offset of 0.43 indicates that the starting point of base segment bsid3 (i.e., base offset 0.0) occurs at a point corresponding to forty-three percent of the distance from the beginning of the tactical lane 718 to its end and the tactical offset 0.83 indicates that the end of base segment bsid3, as indicated by base offset 1.0, occurs at a point corresponding to eighty-three percent of the distance from the beginning of the tactical lane 718 to its end. For bsid4 the tactical offset of 0.83 indicates that the starting point of base segment bsid4 (i.e., base offset 0.0) occurs at a point corresponding to eighty-three percent of the distance from the beginning of the tactical lane 718 to its end and the tactical offset 1.0 indicates that the end of the tactical lane 718 is located in base segment bsid4 at a location indicated by base offset 0.5, which corresponds to fifty percent of the distance from the beginning point of base segment bsid4 to its ending point.

The registration system 340 may process the base map 110 and the tactical map 116 by iterating through map elements that are included in the base map 110 or the tactical map 116. In the implementations described herein, the processes performed by the registration system 340 are performed with respect to the each of the tactical lanes 118 of the tactical map 116, by selecting one of the tactical lanes 118, matching it to one or more of the base segments 112, storing information describing the relationship between the matching map elements in the registration information 120, and then proceeding to the next one of the tactical lanes 118.

For the correspondence determined by the registration system 340 to be valid, the base segments 112 that the tactical lane 118 is registered to must define a traversable (e.g., drivable) sequence of the base segments 112. In this sense, the term "traversable" means that the base segments 112 to which the tactical lane 118 is registered must form a connected subgraph of the base map 110. In one implementation, the sequence of the base segments 112 can be defined by performing a routing query with respect to the base map 110, from a first point on the base segments 112 that is geometrically close to a starting point of the tactical lane 118 to a second point on the base segments 112 that is geometrically close to the ending point of the tactical lane 118. This ensures that the resulting sequence of the base segments 112 is traversable. As used herein, "geometrically close" refers to a smallest distance between the elements in question, and may be evaluated, for example, by well-known geometric techniques that determine the position along a line that is closest to a point that is not located on the line.

In addition, the sequence of the base segments 112 must be geometrically close to the tactical lane 118 if there is a correspondence between the base segments 112 and the tactical lane 118. As will be explained herein, a position comparison technique can be used to determine a probability describing whether the base segments 112 represent the same physical features of the tactical lane 118. For example, as will be explained herein, a proximity metric can be determined for the tactical lane 118 and the sequence of the base segments 112. The proximity metric can be based on, as examples, Hausdorff distance, direction mismatch angle, and a relative length metric such as a length difference value.

In alternative implementations, instead of registering each of the tactical lanes 118 to one or more of the base segments 112, each of the base segments 112 could be mapped to one or more of the tactical lanes. Thus, the processes performed by the registration system 340 could be instead by performed with respect to the base segments 112, by selecting one of the base segments 112, matching it to one or more of the tactical lanes 118, storing information describing the relationship between the matching map elements in the registration information 120, and then proceeding to the next one of the base segments 112. Stated more generally, a first map element from a first map is matched to a series of one or more map elements from a second map. Other features and techniques described herein can be applied to either implementation.

Figure 8:
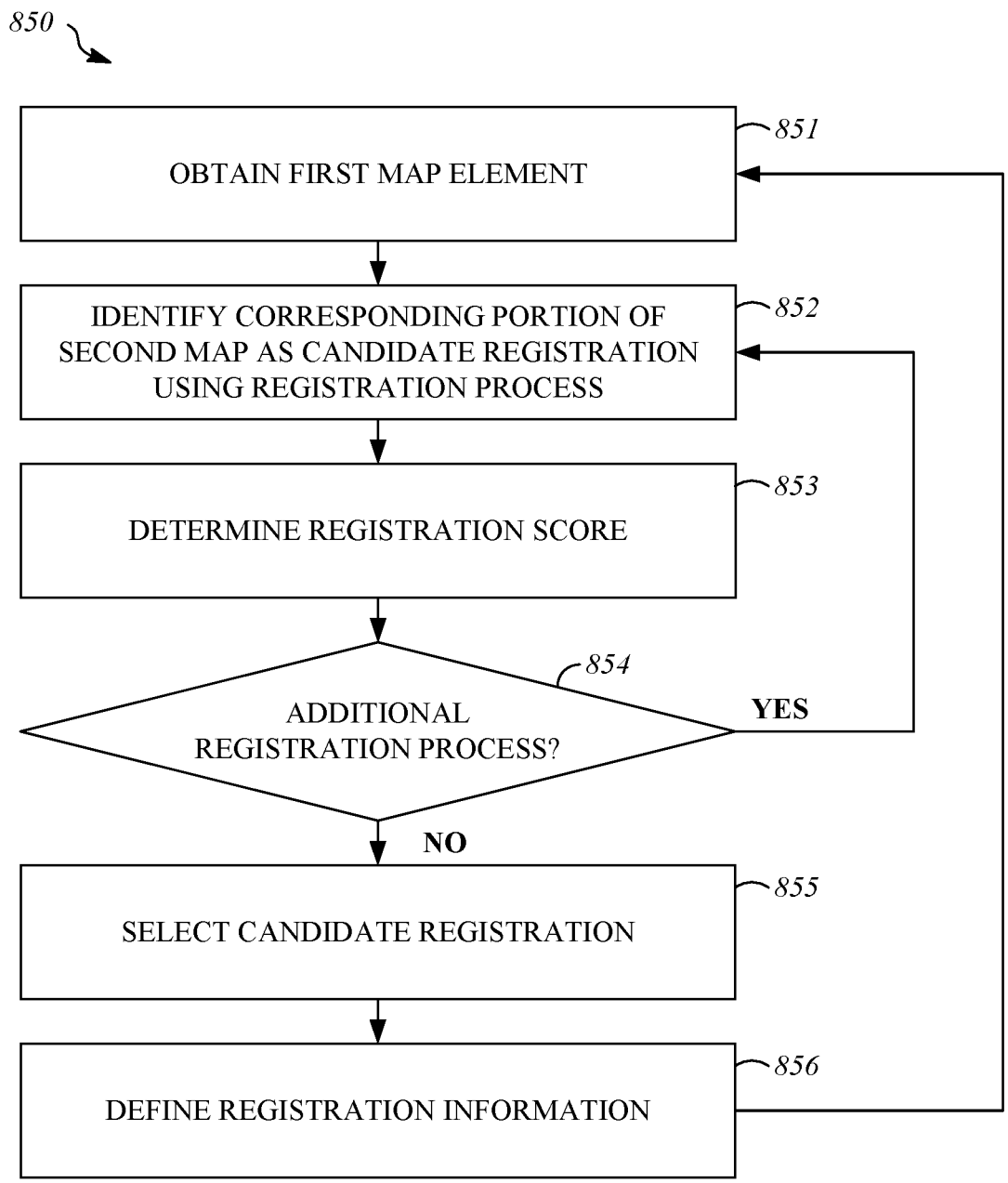
FIG. 8 is a flowchart that shows an example of a process for offline registration of map elements between maps.

FIG. 8 is a flowchart that shows an example of a process 850 for offline registration of map elements between maps. The process 850 can be performed using the registration system 340, and operations of the process can be caused, controlled, or performed by a computing device. The computing device is provided with instructions that are stored in a storage device or a memory device, and a processor that is operable to execute the program instructions. When executed by the processor, the program instructions cause the computing device to perform the operations of the process 850 as described herein.

The process 850 is performed using a first map and a second map, and registers (i.e., determines correspondence between) map elements from the first map ("first map elements") and map elements from the second map ("second map elements"). The first map may be the tactical map 116 and the first map elements may be the tactical lanes 118. The second map may be the base map 110 and the second map elements from the second map may be the base segments 112.

In operation 851, a first map element is obtained from the first map. As used herein, obtained means that information describing the map element is made available for use, such as by accessing the information from a storage device, accessing the information from memory, or receiving the information by a transmission from another system. As an example, the first map may be the tactical map 116 and the first map element may be one of the tactical lanes 118 form the tactical map 116.

In operation 852, a corresponding portion of a second map is identified as a candidate registration using a registration process. The corresponding portion may be defined by one or more second map elements from the second map and represents map elements from the second map that may correspond to the same physical infrastructure that is represented by the first map elements from the first map. As an example, the second map may be the base map 110, and the second map elements may be the base segments 112 of the base map 110. The registration process may be one of several registration processes that are available for use, and each registration process may result in differing extents for the corresponding portion from the second map. The corresponding portions from the second map that are identified by each registration process may be considered registration candidates that may be selected as final registrations, dependent on scoring, as will be described. Specific examples of registration processes will also be described in detail herein.

In operation 853, a registration score is determined. The registration score describes accuracy of the match between the first map element and the corresponding portion of the second map. The registration score may be determined based on factors that are indicative of similarity of the corresponding portion of the second map to the first map element.

As an example, the registration score may be based on a comparison of position, angle and/or length of the first map element and the corresponding portion of the second map. Other factors may optionally be included in the determination of the weighting score. The registration score may be determined by calculating component scores for these and/or other factors and combining them according to weighting factors or in any other suitable manner.

Proximity of the first map element to the corresponding portion of the second map represents the extent to which the map elements are co-located or deviate in position with respect to each other, with a more favorable score (e.g., a higher score) being assigned when the map elements being compared exhibit a high degree of co-location. As one example, proximity can be measured and scored based on a Hausdorff distance value, which represents the largest distance from any point on one line to the closest point on the other line.

A comparison of an angular orientation of the first map element to an angular orientation of the corresponding portion of the second map represents the degree to which the map elements agree in directionality. This comparison can be sensitive to directionality of travel lanes, such that an angular difference of around one-hundred and eighty degrees may be present between maps elements that correspond to opposed travel directions. As an example, an angle may be defined between beginning and end points of the first map element and beginning and end points of the corresponding portion from the second map, and the angular comparison score would be based on the difference in angles between the map elements, with smaller angular differences corresponding to more favorable scores.

A comparison of a length of the first map element to a length of the corresponding portion of the second map ensures that registered portions of maps have similar lengths. This avoids, for example, matches based solely on end point locations without consideration of the routes taken by map elements between the end points. The length comparison score would be based on the difference in length between the first map element and the corresponding portion of the second map, with smaller length differences corresponding to more favorable scores.

After the registration score is determined for each of the registration candidates, at operation 854, the process returns to operation 852 if the first map element will be analyzed further by one or more additional registration processes. Otherwise, the process 850 proceeds to operation 855.

At operation 855, the highest scoring candidate registration (which is a corresponding portion of the second map identified using one of the registration processes) is selected. This is a determination that the portion of the second map that is represented by the highest scoring candidate registration is a match to the first map element. At operation 856, registration information is defined and stored, such as by adding an entry to the registration information 120. The registration information that is defined and stored at operation 856 describes a relationship between the first map element and the corresponding portion of the second map that was selected in operation 855. The process 850 then returns to operation 851 to analyze further map elements from the first map.

Using the registration information 120 that is determined in the process 850, road attributes and routing costs can be transferred between maps, such as from base segments 112 of the base map 110 to tactical lanes 118 of the tactical map 116. This transfer can be done in real time and can allow transfer of real-time information (current traffic levels, road closures, etc.) from the base map 110 to the tactical map 116. Thus, this approach allows separating the heavy computations that can be done offline in advance from the fast, real-time transfer of road attributes and actual costs based on compact precomputed lane mapping records.

It should be understood that multiple instances of the process 850 may be performed in parallel. In particular, registration of a map element from the first map to a portion of the second map need not consider information obtained during registration of any other map element from the first map to a portion of the second map. Thus, for example, a distributed computing process could be used to perform the process 850, such as by assigning map elements from the first map to each of multiple computing systems for analysis.

Figure 9:
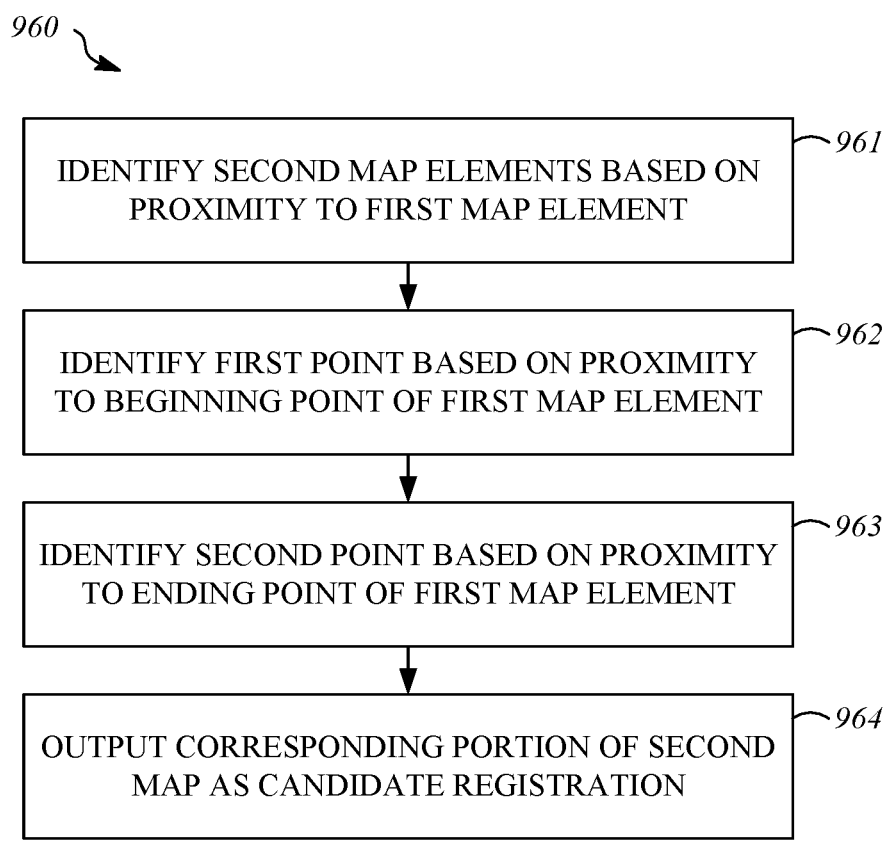
FIG. 9 is a flowchart that shows a registration process according to a first example.

FIG. 9 is a flowchart that shows a registration process 960 according to a first example. The registration process 960 can be used in the context of the process 850 to identify the corresponding portion of the second map as a candidate registration for the first map element. The registration process 960 is intended to handle registration cases in which the first map element corresponds to a single one of the second map elements from the second map. Thus, in the registration process 960, the corresponding portion of the second map includes only one of the second map elements. The registration process 960 can be performed using the registration system 340, and operations of the process can be caused, controlled, or performed by a computing device. The computing device is provided with instructions that are stored in a storage device or a memory device, and a processor that is operable to execute the program instructions. When executed by the processor, the program instructions cause the computing device to perform the operations of the registration process 960 as described herein.

The registration process 960 identifies a corresponding portion (e.g., sequence of one or more second map elements) of the second map as a candidate registration for the first map element. The process may receive one of the first map elements as an input and generates the corresponding portion of the second map as an output. The first map may be the tactical map 116 and the first map elements may be the tactical lanes 118. The second map may be the base map 110 and the second map elements may be the base segments 112.

In operation 961, second map elements from the second map are identified based on their locations relative to the first map element from the second map. The intention of operation 961 is to identify map elements from the second map that are located near the first map element. As one example the second map elements can be identified if they are located within a predetermined distance (e.g., radius) around the first map element. As another example, a predetermined number of the closest second map elements from the second map can be identified.

In operation 962, a first point is identified on the second map elements based on proximity to a beginning point of the first map element. The beginning point on the first map element may be, for example, an area located on the first map element at its beginning as determined with respect to a travel direction associated with the first map element. The first point can be determined using well-known geometric techniques.

In operation 963, a second point is identified on the second map element that was identified in operation 962, based on proximity to an ending point of the first map element. The ending point on the first map element may be, for example, an area located on the first map element at its end as determined with respect to a travel direction associated with the first map element. The second point can be determined using well-known geometric techniques.

In operation 964, the second map element on which the first point and the second point were identified is identified as a corresponding portion of the second map (i.e., possibly representing the same physical features as the first map element) and is output as a candidate registration. The candidate registration may include an identifier that corresponds to the identified second map element, a beginning offset value, and an ending offset value. Further analysis can be performed as described with respect to the process 850.

Figure 10:
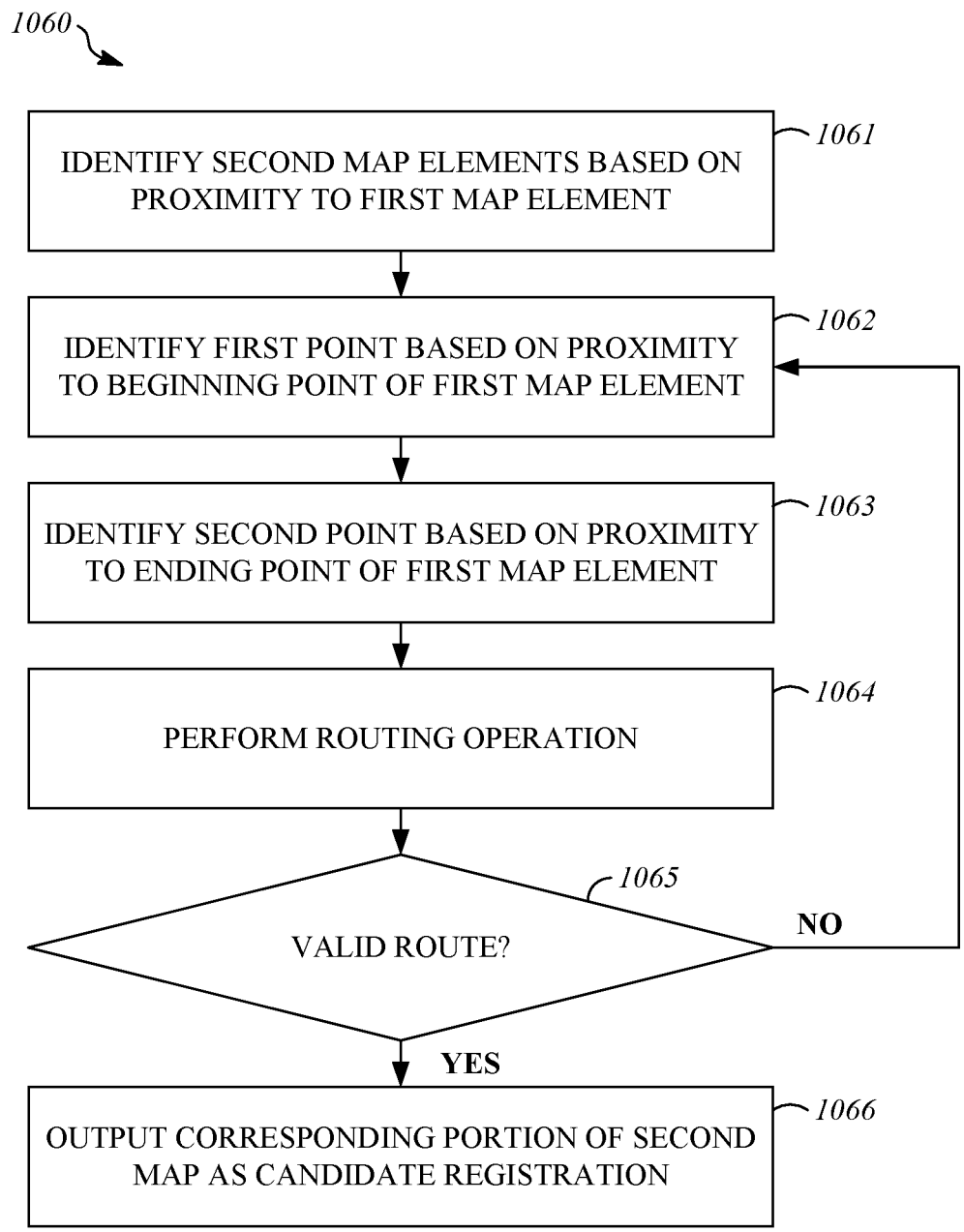
FIG. 10 is a flowchart that shows a registration process according to a second example.

FIG. 10 is a flowchart that shows a registration process 1060 according to a second example. The registration process 1060 can be used in the context of the process 850 to identify the corresponding portion of the second map as a candidate registration. The registration process 1060 is intended to handle registration cases in which the first map element corresponds to two or more of the second map elements from the second map. Thus, the corresponding portion of the second map is defined by two or more of the second map elements that are sequentially connected in the registration process 1060. The registration process 1060 can be performed using the registration system 340, and operations of the process can be caused, controlled, or performed by a computing device. The computing device is provided with instructions that are stored in a storage device or a memory device, and a processor that is operable to execute the program instructions. When executed by the processor, the program instructions cause the computing device to perform the operations of the process 1060 as described herein.

The registration process 1060 identifies a corresponding portion (e.g., sequence of one or more second map elements) of the second map as a candidate registration for the first map element. The process may receive one of the first map elements as an input and generates the corresponding portion of the second map as an output. The first map may be the tactical map 116 and the first map elements may be the tactical lanes 118. The second map may be the base map 110 and the second map elements may be the base segments 112.

In operation 1061, second map elements from the second map are identified based on their locations relative to the first map element from the second map. The intention of operation 1061 is to identify map elements from the second map that are located near the first map element. As one example the second map elements can be identified if they are located within a predetermined distance (e.g., radius) around the first map element. As another example, a predetermined number of the closest second map elements from the second map can be identified.

In operation 1062, a first point is identified on the second map elements based on proximity to a beginning point of the first map element. The beginning point on the first map element may be, for example, an area located on the first map element at its beginning as determined with respect to a travel direction associated with the first map element. The first point can be determined using well-known geometric techniques.

In operation 1063, a second point is identified on the second map elements that were identified in operation 1062, based on proximity to an ending point of the first map element. In this example, the first point and the second point are located on different map elements from the second map elements. The ending point on the first map element may be, for example, an area located on the first map element at its end as determined with respect to a travel direction associated with the first map element. The second point can be determined using well-known geometric techniques.

In operation 1064, a routing operation is performed to define a route between the first point and the second point along the second map elements. Routing can be performed according to well-known methods. The result of the routing operation may be a series of the second map elements that are sequentially connected and define a valid, traversable route. In operation 1065, if a valid route has been defined, the process proceeds to operation 1066. Otherwise, the process returns to operation 1062 to reselect one or both of the first and second points in a manner that defines a different route, such as by excluding the map elements where one or both of the previously-selected first and second points where found.

Checking whether a valid route has been defined in operation 1065 constitutes a determination as to whether the first point and the second point that were identified in operations 1062 and 1063 correspond to starting and ending points of a traversable route. Stated differently, operation 1065 verifies that the starting point and the ending point can be used to define a sequence of sequentially connected map elements from the second map elements by determining that a traversable route exists along the second map elements from the first point to the second point.

In operation 1066, the second map elements from the route from the first point to the second point is identified as a corresponding portion of the second map (i.e., possibly representing the same physical features as the first map element) and is output as a candidate registration. The candidate registration may include a list of all of the second map elements in the corresponding portion of the second map, a beginning offset value, and an ending offset value. Further analysis can be performed as described with respect to the process 850.

Figure 11:
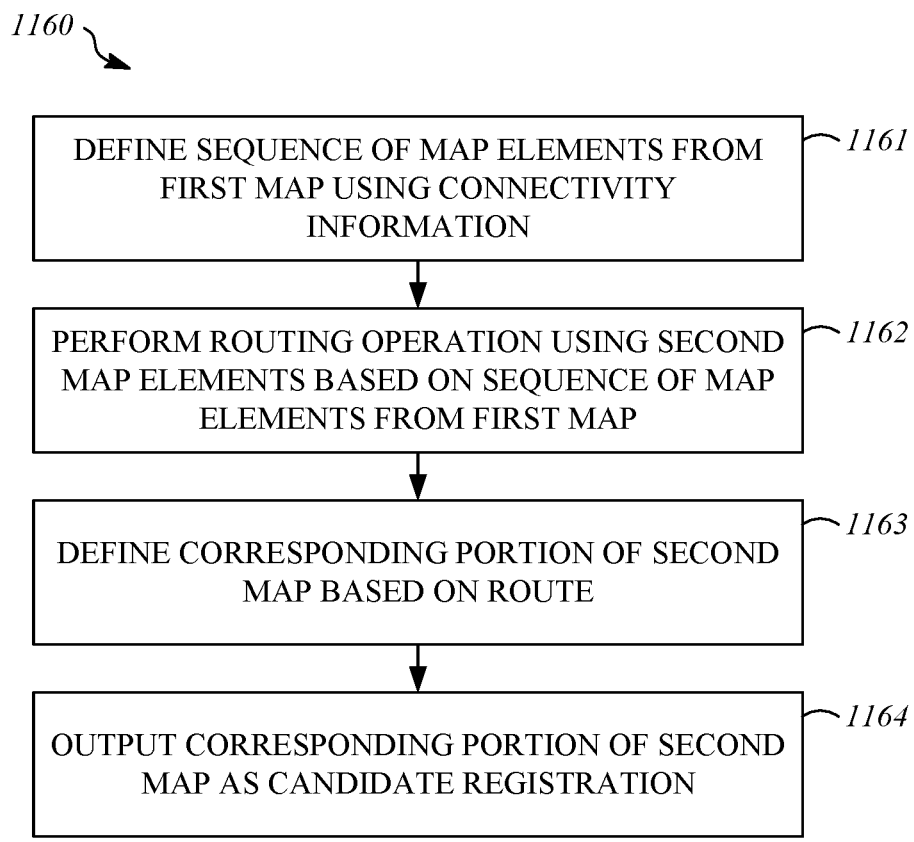
FIG. 11 is a flowchart that shows a registration process according to a third example.

FIG. 11 is a flowchart that shows a registration process 1160 according to a third example. The registration process 1160 can be used in the context of the process 850 to identify the corresponding portion of the second map as a candidate registration. The registration process 1160 is intended to handle registration cases in which a meaningful routing query cannot be performed, such as for a short map element, by creating a lane sequence of a reasonably large length. In the registration process 1160, identifying the second map elements includes identifying a sequence of map elements from the first map, the sequence of map elements including the first map element from the first map, and determining a route using the second map elements that corresponds to travel from a start point of the sequence of map elements from the first map to an end point of the sequence of map elements from the first map.

The corresponding portion of the second map that is identified by the registration process 1160 includes one or more of the second map elements. The registration process 1160 can be performed using the registration system 340, and operations of the process can be caused, controlled, or performed by a computing device. The computing device is provided with instructions that are stored in a storage device or a memory device, and a processor that is operable to execute the program instructions. When executed by the processor, the program instructions cause the computing device to perform the operations of the process 1160 as described herein.

The registration process 1160 identifies a corresponding portion (e.g., sequence of one or more second map elements) of the second map as a candidate registration for the first map element. The process may receive one of the first map elements as an input and generates the corresponding portion of the second map as an output. The first map may be the tactical map 116 and the first map elements may be the tactical lanes 118. The second map may be the base map 110 and the second map elements may be the base segments 112.

In operation 1161 connectivity information describing connections between map elements from the first map is used to extend forward and/or backward from the first map element to define a sequence of map elements from the first map. In operation 1162, a routing operation is performed using the second map elements to define a route that extends from a point corresponding to a beginning of the sequence of map elements from the first map to a point corresponding to an ending of the sequence of map elements from the first map. The route defined in operation 1162 includes one or more of the second map elements from the second map. In operation 1163, the corresponding portion of the second map is defined by clipping the route defined in operation 1162 based on the starting and ending points of the first map element.

In operation 1164, the corresponding portion of the second map that was defined in operation 1163 is output as a candidate registration. The candidate registration may include a list of all of the second map elements in the corresponding portion of the second map, a beginning offset value, and an ending offset value. Further analysis can be performed as described with respect to the process 850.

In an alternative implementation of the registration process 1160, the sequence of map elements from the first map may be replaced by the single map element that is being registered. This alternative is intended for registration in cases where the starting and ending points of the first map element do form a meaningful routing query.

In another implementation, the registration information 120 can be re-used for certain ones of the tactical lanes 118 when they have strongly connected left and/or right neighbor lanes that have already been registered. When these are strongly connected, it signifies that lane changes are legal both ways between such neighbor lanes, it can be assumed that they correspond to the same base road segment and their routing costs are the same. Therefore, the registration information 120 can be computed for one lane from a set of neighbor lanes and the registration information can be reused for all of the strongly connected neighbor lanes in the set to reduce overall registration time.

Figure 12:
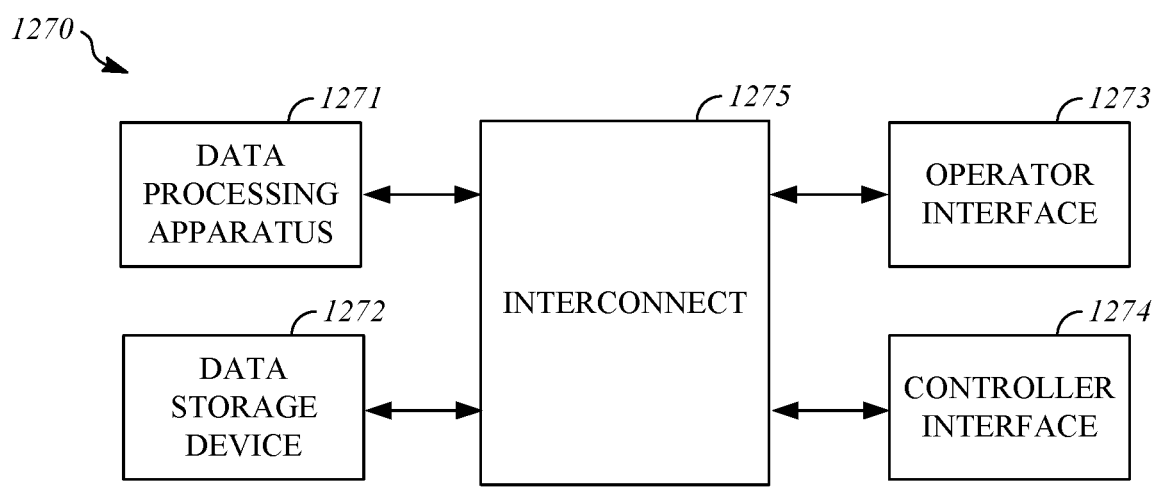
FIG. 12 is a block diagram that shows an example of a computing device.

FIG. 12 shows an example hardware configuration for a controller 1270 that may be utilized to implement portions of the routing system 120 and the registration system 340. The hardware configuration includes a data processing apparatus 1271, a data storage device 1272, an operator interface 1273, a controller interface 1274, and an interconnect 1275 through which the data processing apparatus 1271 may access the other components. The data processing apparatus 1271 is operable to execute instructions that have been stored in a data storage device 1272. In some implementations, the data processing apparatus 1271 is a processor with random access memory for temporarily storing instructions read from the data storage device 1272 while the instructions are being executed. For example, the data storage device 1272 may be a non-volatile information storage device such as a hard drive or a solid-state drive. The operator interface 1273 facilitates communication with a user of the controller 1270 and may include any type of human-machine interface such as buttons, switches, a touchscreen input device, a gestural input device, an audio input device, a display, and/or a speaker. The controller interface 1274 allows input and output of information to other systems, as examples, for allowing display at an external system or for allowing automated control of another system. The interconnect 1275 may be, as examples, a system bus, a wired network, or a wireless network.

As described above, one aspect of the present technology is the gathering and use of data available from various sources to utilize offline registration of map information in support of navigation routing. Some implementations and uses of the present technology may include receiving information from users of the system, receiving information about the users of the system, other otherwise receiving information about persons to improve routing-related functions and to provide other features in the context of a mapping system or navigation system. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to recommend destinations to users. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal information for use in the provision of certain types of services. In yet another example, users can select to limit the length of time that personal information is stored. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, services can be provided based on non-personal information data or a bare minimum amount of personal information, such as the content being requested by the device associated with a user, other non-personal information, or publicly available information.

What is claimed is:

1. A method, comprising:
    obtaining a first map element from a first map;
    identifying second map elements from a second map based on locations of the second map elements from the second map relative to the first map element from the first map;
    identifying a first point on the second map elements from the second map based on proximity to a beginning point of the first map element from the first map;
    identifying a second point on the second map elements from the second map based on proximity to an ending point of the first map element from the first map, wherein one or more of the second map elements from the second map define a corresponding portion of the second map between the first point and the second point;
    determining a registration score for the first map element from the first map relative to the corresponding portion of the second map; and
    in response to determining that the registration score indicates a match between the first map element from the first map and the corresponding portion of the second map, defining registration information that includes, for the first map element from the first map, information that identifies a location of the first point on the second map elements from the second map as corresponding to the beginning point of the first map element from the first map, and information that identifies a location of the second point on the second map elements from the second map as corresponding to the ending point of the first map element from the first map; and
    storing the registration information for use in transferring information between the first map and the second map.

2. The method of claim 1, wherein the registration score is based in part on proximity of the first map element from the first map to the corresponding portion of the second map.

3. The method of claim 2, wherein proximity of the first map element from the first map to the corresponding portion of the second map is determined based on a Hausdorff distance value.

4. The method of claim 1, wherein the registration score is based in part on a comparison of an angular orientation of the first map element from the first map to an angular orientation of the corresponding portion of the second map.

5. The method of claim 1, wherein the registration score is based in part on a comparison of a length of the first map element from the first map to a length of the corresponding portion of the second map.

6. The method of claim 1, wherein the corresponding portion of the second map includes only one of the second map elements from the second map.

7. The method of claim 1, wherein the corresponding portion of the second map is defined by two or more of the second map elements from the second map that are sequentially connected.

8. The method of claim 7, further comprising:
    verifying that the corresponding portion of the second map is defined by sequentially connected map elements from the second map elements from the second map by determining that a traversable route exists along the second map elements from the second map from the first point to the second point.

9. The method of claim 1, wherein identifying the second map elements from the second map includes identifying a sequence of map elements from the first map, the sequence of map elements including the first map element from the first map, and determining a route using the second map elements from the second map that corresponds to travel from a start point of the sequence of map elements to an end point of the sequence of map elements.

10. The method of claim 1, wherein the registration information includes a beginning offset value that represents the location of the first point as a first distance measured along the one or more of the second map elements from the corresponding portion of the second map, and an ending offset value that represents the location of the second point as a second distance measured along the one or more of the second map elements from the corresponding portion of the second map.

11. The method of claim 1, wherein:
    the information that identifies the location of the first point on the second map elements from the second map as corresponding to the beginning point of the first map element from the first map identifies a first one of the second map elements as corresponding to the beginning point of the first map element from the first map and describes the location of the beginning point of the first map element from the first map as a position along the first one of the second map elements, and
    the information that identifies the location of the second point on the second map elements from the second map as corresponding to the ending point of the first map element from the first map identifies a second one of the second map elements as corresponding to the ending point of the first map element from the first map and describes the location of the ending point of the first map element from the first map as a position along the second one of the second map elements.

12. The method of claim 1, further comprising:
    transferring information from the first map to the second map using the registration information.

13. A non-transitory computer-readable storage device including program instructions executable by one or more processors that, when executed, cause the one or more processors to perform operations, the operations comprising:
    obtaining a first map element from a first map;
    identifying second map elements from a second map based on locations of the second map elements from the second map relative to the first map element from the first map;
    identifying a first point on the second map elements from the second map based on proximity to a beginning point of the first map element from the first map;
    identifying a second point on the second map elements from the second map based on proximity to an ending point of the first map element from the first map, wherein one or more of the second map elements from the second map define a corresponding portion of the second map between the first point and the second point;

determining a registration score for the first map element from the first map relative to the corresponding portion of the second map; and in response to determining that the registration score indicates a match between the first map element from the first map and the corresponding portion of the second map, defining registration information that includes, for the first map element from the first map, information that identifies a location of the first point on the second map elements from the second map as corresponding to the beginning point of the first map element from the first map, and information that identifies a location of the second point on the second map elements from the second map as corresponding to the ending point of the first map element from the first map; and storing the registration information for use in transferring information between the first map and the second map.

14. The system of claim 13, wherein:
the registration score is based in part on proximity of the first map element from the first map to the corresponding portion of the second map,
the registration score is based in part on a comparison of an angular orientation of the first map element from the first map to an angular orientation of the corresponding portion of the second map, and
the registration score is based in part on a comparison of a length of the first map element from the first map to a length of the corresponding portion of the second map.

15. The non-transitory computer-readable storage device of claim 13, wherein the corresponding portion of the second map is defined by two or more of the second map elements from the second map that are sequentially connected, wherein the operations further include verifying that the corresponding portion of the second map is defined by sequentially connected map elements from the second map elements from the second map by determining that a traversable route exists along the second map elements from the second map from the first point to the second point.

16. The non-transitory computer-readable storage device of claim 13, wherein identifying the second map elements from the second map includes identifying a sequence of map elements from the first map, the sequence of map elements including the first map element from the first map, and determining a route using the second map elements from the second map that corresponds to travel from a start point of the sequence of map elements to an end point of the sequence of map elements.

17. The non-transitory computer-readable storage device of claim 13, wherein the registration information includes a beginning offset value that represents the location of the first point as a first distance measured along the one or more of the second map elements from the corresponding portion of the second map, and an ending offset value that represents the location of the second point as a second distance measured along the one or more of the second map elements from the corresponding portion of the second map.

18. A system, comprising:
a memory; and
a processor configured to execute instructions stored in the memory to:

obtain a first map element from a first map;
identify second map elements from a second map based on locations of the second map elements from the second map relative to the first map element from the first map;
identify a first point on the second map elements from the second map based on proximity to a beginning point of the first map element from the first map;
identify a second point on the second map elements from the second map based on proximity to an ending point of the first map element from the first map, wherein one or more of the second map elements from the second map define a corresponding portion of the second map between the first point and the second point;
determine a registration score for the first map element from the first map relative to the corresponding portion of the second map; and
in response to a determination that the registration score indicates a match between the first map element from the first map and the corresponding portion of the second map, define registration information that includes, for the first map element from the first map, information that identifies a location of the first point on the second map elements from the second map as corresponding to the beginning point of the first map element from the first map, and information that identifies a location of the second point on the second map elements from the second map as corresponding to the ending point of the first map element from the first map; and
store the registration information for use in transferring information between the first map and the second map.

19. The non-transitory computer-readable storage device of claim 18, wherein:
the registration score is based in part on proximity of the first map element from the first map to the corresponding portion of the second map,
the registration score is based in part on a comparison of an angular orientation of the first map element from the first map to an angular orientation of the corresponding portion of the second map, and
the registration score is based in part on a comparison of a length of the first map element from the first map to a length of the corresponding portion of the second map.

20. The system of claim 18, wherein the corresponding portion of the second map is defined by two or more of the second map elements from the second map that are sequentially connected, wherein the processor identifies that the corresponding portion of the second map is defined by sequentially connected map elements from the second map elements from the second map by determining that a traversable route exists along the second map elements from the second map from the first point to the second point.

21. The system of claim 18, wherein identification of the second map elements from the second map includes identification of a sequence of map elements from the first map, the sequence of map elements including the first map element from the first map, and determination of a route using the second map elements from the second map that corresponds to travel from a start point of the sequence of map elements to an end point of the sequence of map elements.

22. The system of claim 18, wherein the registration information includes a beginning offset value that represents the location of the first point as a first distance measured along the one or more of the second map elements from the corresponding portion of the second map, and an ending offset value that represents the location of the second point as a second distance measured along the one or more of the second map elements from the corresponding portion of the second map.

* * * * *